United States Patent Office 3,136,738
Patented June 9, 1964

3,136,738
GRAFT COPOLYMER OF POLYLACTAM ON POLYMER CONTAINING TERTIARY AMINE GROUP
Ross M. Hedrick, Edward H. Mottus, and John M. Butler, Dayton, Ohio, assignors to Monsanto Company, a corporation of Delaware
No Drawing. Filed Feb. 10, 1960, Ser. No. 7,755
16 Claims. (Cl. 260—45.5)

This invention relates to a novel graft copolymer composition and to the method of preparing same. More particularly this invention relates to graft copolymers prepared by the formation of polylactam side chains on active sites of a vinyl copolymer, terpolymer, etc., backbone.

The preparation of graft copolymers as a general class, i.e., a material consisting of polymer backbones to which are attached side chains of another polymeric material, have been known for some time. However, the usual prior art "graft copolymers" generally contain mixtures of the graft copolymer together with free polymer backbones and free unattached side-chain polymers. Such mixtures often have little or no value and require expensive treatment by fractionation techniques in order to obtain the graft copolymer substantially free of the homopolymers, copolymers, etc., as the case may be. In certain cases the mixtures can be employed, particularly if the backbone polymer is compatible with the side-chain polymer and each polymer is also compatible with the graft copolymer.

It is the principal object of the instant invention to directly prepare graft copolymers which are essentially free from unreacted backbone polymers and unreacted side-chain polymers. Other objects and advantages of this invention will be apparent to those skilled in the art from the following disclosure.

We have earlier disclosed and claimed the improved process of preparing polycaprolactam by the anionic polymerization of ε-caprolactam in the presence of various N,N-diacyl tertiary amine promoter compounds in concentrations of from about 0.01 to about 20 mole percent, and preferably from about 0.1 to about 1 mole percent, of the caprolactam monomer, wherein the polymerization reaction is effected in a short period of time, e.g., less than two hours, at temperatures preferably below about 200° C. to obtain conversions of the order of about 99 percent in our copending application Serial No. 627,984, filed December 13, 1956, now U.S. Patent No. 3,017,391, of which this application is a continuation-in-part. The promoter compounds were broadly exemplified in the aforesaid parent application, which is incorporated herein by reference, and may be briefly illustrated by the N-substituted imides, as N-acyl lactams, cyclic imides of dicarboxylic acids, and the like; N-acyl sulfonamides, N,N-disulfonamides, N-nitrosoamides, N-nitrososulfonamides, and the like. Also suitable promoters could be formed in situ with isocyanates, ketenes, acid chlorides and anhydrides which effect the formation of the essential promoter structure by reaction with the caprolactam monomer.

It has now been found that the aforesaid N,N-diacyl tertiary amine essential promoter structure can be incorporated in a vinyl copolymer, terpolymer, etc., backbone to provide active sites to promote the grafting of a polylactam side chain to the vinyl backbone at each of such active sites present in the vinyl polymer composition. Accordingly, it is possible to prepare a large variety of polymer compositions comprising a polycaprolactam graft on a vinyl backbone, which graft copolymer compositions are free from the backbone polymer and side-chain polymer components per se.

Suitable monomer non-site-containing materials which can be copolymerized with the site-containing monomers are ethylenic compounds such as styrene, ethylene, propylene, isobutylene, and the like, and preferably the vinyl hydrocarbons, i.e. the compounds having the structure $CH_2=CH_2$ wherein one or more, but preferably one, of the hydrogen atoms is substituted with a hydrocarbon radical, e.g., an aryl or lower alkyl radical, containing less than about 10 carbon atoms.

Illustrative site-containing ethylenic monomers, or precursor monomers thereof which are capable of forming the essential active sites in situ, are N-acrylylcaprolactam and other lactam derivatives thereof; N-methacrylylcaprolactam and other lactam derivatives thereof together with other lower alkyl radicals in place of the methyl radical; N-vinyl imides as N-vinylsuccinimide, N-vinylphthalimide, N-vinyldithiosuccinimde, N-vinyltetrahydrophthalimide, and the like; N-substituted maleimides, wherein the substituent group is preferably a monovalent hydrocarbon radical free from non-benzenoid unsaturation, preferably containing less than about 20 carbon atoms, and more preferably still containing less than about 13 carbon atoms, as aryl, lower alkyl, cycloalkyl, alkaryl, and aralkyl radicals, such as N-phenylmaleimide, N-biphenylylmaleimide, N-methylmaleimide, N-ethylmaleimide, N-butylmaleimide, N-cyclohexylmaleimide, N-cyclopentylmaleimide, N-tolylmaleimide, N-xylylmaleimide, N-mesitylmaleimide, N-cumylmaleimide, N-benzylmaleimide, N-phenethylmaleimide, and the like; methacrylyl chloride, acrylyl bromide, vinylbenzoyl chloride, p-vinylbenzenesulfonyl chloride, etc., i.e. vinyl compounds containing the acyl halide group; α,β-ethylenically unsaturated dicarboxylic anhydrides such as maleic anhydride, citraconic anhydride, and the like; and vinyl compounds containing the isocyanate radical, e.g., p-isocyanatostyrene, β-isocyanatoethyl methacrylate, and the like.

The vinyl precursor monomers can first be copolymerized with the non-site-containing vinyl monomers and the copolymer composition reacted with a lactam, such as caprolactam, to effect the formation of the active site for grafting the polylactam chain, or the precursor monomers can be first reacted in substantially equimolecular quantities with the lactam, and preferably a small molar excess of the lactam. The latter procedure is preferred with the vinyl acyl halide monomers since it permits the ready removal of the hydrogen halide by-product, whereby additional anionic polymerization catalyst is not required and the graft copolymer composition does not require treatment to remove the salts therefrom. Similarly it is desirable to employ the latter procedure with the α,β-ethylenically unsaturated dicarboxylic anhydrides wherein the remaining carboxyl group may be converted to a hydrophilic group by reaction with an alkali metal such as sodium or potassium, or ammonia, or may be rendered substantially inactive by esterification with an alcohol, reaction with a primary amine to form an amide, etc. However, if an alkali metal salt is desired, the anhydride and vinyl monomer can be copolymerized to provide the vinyl polymer backbone and the necessary amount of additional anionic catalyst is then supplied at the time the polylactam is grafted thereto such that there is sufficient catalyst to react with the available carboxyl groups in addition to the quantity desired to catalyze the polymerization of the lactam.

Thus the vinyl backbone copolymer or heteropolymer can be ethylene/maleic anhydride, styrene/maleic anhydride, isobutylene/maleic anhydride, styrene/N-methacrylylcaprolactam, styrene/N-methacrylyl chloride, styrene/N - vinylsuccinimide, styrene/N-vinylphthalimide, styrene/N-phenylmaleimide, styrene/N-methylmaleimide, styrene/p - isocyanatostyrene, styrene/β-isocyanatoethyl methacrylate, p-isocyanatostyrene/N-acrylylcaprolactam, N-vinylsuccinimide/β-isocyanatoethyl methacrylate, N-ethylmaleimide/N-methacrylylcaprolactam, and the like. It should also be understood that the vinyl polymer backbone is not limited to copolymer compositions, but a plurality of the various monomers disclosed hereinabove can be employed. Thus the polymer backbone composition can be prepared wherein each monomer unit contains an active site, but in general it is desirable that at least about 50 mole percent of the monomer employed be selected from the class of non-site-containing monomers and preferably at least about 90 mole percent of the vinyl backbone polymer will be from this class.

Whereas the term "copolymer" has been employed in the limiting sense of the product obtained by the conjoint polymerization of two or more unsaturated compounds each of which can be polymerized alone to provide a homopolymer product, the term is more broadly employed in the instant application to include heteropolymers, i.e., the conjoint polymerization product of polymerizable monomers such as styrene and ethylene with certain unsaturated compounds which are not polymerizable by themselves, e.g., maleic anhydride.

The polymerization of the vinyl backbone can be carried out by the well known methods of vinyl polymerization, i.e., by mass, solution, or emulsion polymerization, depending on the choice of monomers by radiant energy as ultraviolet light photopolymerization and visible light in the presence of catalysts such as salts of uranium, cobalt, vanadium and lead, and thermal polymerization particularly in the presence of catalytic amounts of ozone, and peroxides, such as benzoyl peroxide, lauroyl peroxide, tert.-butyl hydrogen peroxide, acetyl peroxide, stearoyl peroxide and other free-radical-promoting catalysts as peracetic acid, sodium perborate, potassium persulfate, and the like, and by metal alkyls such as lead tetraethyl. The catalysts can be added all at once, in increments, or continuously over a period of time. In general it is known that iron, zinc, nickel and copper exhibit an inhibitory effect on the polymerization of vinyl compounds such that their presence should be avoided in the polymerization system.

In general polymerization conditions for the production of vinyl polymers can be varied over a considerable range. Thus the polymerization temperature can be varied from temperatures below 0° C. to a temperature below the decomposition point of the reactants, for example from about $-30°$ to about 200° C., and will generally range from room temperature (about 20° C.) to about 120° C. When thermal polymerization in the presence of a free-radical-promoting catalyst is employed the reaction temperature preferably is selected such that the catalyst is decomposed at a moderate rate during the course of the reaction, for example, if benzoyl peroxide is the free-radical-promoting catalyst a temperature in the range of from about 60° C. to about 90° C. is generally preferred. Furthermore the polymerization reaction with a free-radical-promoting catalyst can be employed in conjunction with ultraviolet radiation, whereby the catalysts are photochemically decomposed and the polymerization reaction can then be initiated at substantially lower temperatures than when the free-radical-promoting catalyst is employed alone.

The catalyst concentration can be varied over a range of from about 0.005 to about 5 weight percent and preferably from about 0.1 to about 3 weight percent based on the vinyl monomers. As a general rule it should be borne in mind that the higher the polymerization temperature and the greater the concentration of catalyst, the lower the molecular weight of the backbone polymer.

The vinyl polymerization reactions are preferably carried out in a closed system and can be pressured with nitrogen or other inert atmosphere, and superatmospheric pressures can be employed as necessary, e.g., will generally be required for the polymerization of highly volatile and gaseous monomers, thus pressures of up to the order of about 3000 atmospheres are within the scope of the preparation of the backbone polymer compositions.

It will be apparent from the foregoing disclosure that a large variety of site-containing polymer backbone compositions can be prepared.

The active or initiator site on the polymer backbone can be broadly defined as an N,N-diacyl unit containing the essential active group:

wherein N is a tertiary nitrogen atom, A is an acyl radical selected from the group consisting of R'- carbonyl, R'- thiocarbonyl, R' - sulfonyl, R'$_2$ - phosphonyl, and R'$_2$- thiophosphonyl radicals, B is an acyl radical of the A group and the nitroso radical, i.e.

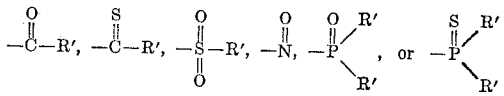

and R is a third substituent of the same kind of general type as A or B, or a monovalent hydrocarbon radical, preferably containing less than about 13 carbon atoms, such as aryl, alkyl, aralkyl, alkaryl, cycloalkyl, etc.; or a heterocyclic radical such as pyridyl, quinolyl, etc.; or any of the aforementioned groups substituted with or containing additional radicals or groups such as carbonyl, N-substituted carbamyl, alkoxy, ether, sulfonyl, tertiary amino, etc.; or any other non-interfering groups, i.e. groups which will not preferentially react with the lactam or which will otherwise interfere with the essential effective activity of the polymerization catalyst.

The substituents R' attached to the carbonyl, thiocarbonyl, sulfonyl, phosphonyl and thiophosphonyl radicals of the acyl radicals A and B are unlimited, provided they are free of interfering groups (e.g. primary amino groups or strong acid functions which will interfere with the alkali or alkaline metal catalysts). Examples of non-interfering groups are hydrogen atoms, as well as the monovalent hydrocarbon and heterocyclic radicals mentioned in the preceding paragraph, including such radicals containing additional groups therein as set out in the preceding paragraph. Said R' groups preferably do not contain over 10 carbon atoms.

The radicals A and B can be joined together as with a methylene chain to form a ring, a portion of which ring can also include a portion of the polymer backbone, and the radicals A and R can also constitute a part of a ring system not including the radical B. At least one of the radicals A, B, and R must be directly or indirectly linked to the backbone polymer chain as hereinafter more fully illustrated.

Such active or initiator sites on the polymer backbone can be shown by a few illustrative examples. Thus the portion of the backbone polymer containing N-acrylyl-caprolactam or N-methacrylylcaprolactam would have the structure:

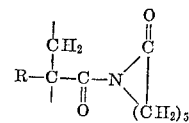

where R'' is —H or —CH$_3$,
β-isocyanatoethyl methacrylate and p-isocyanatostyrene after polymerization and in situ reaction with a mole equivalent of caprolactam would respectively have the structures:

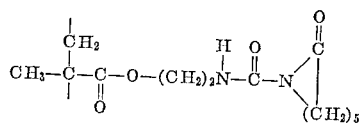

and

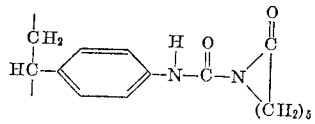

N-vinyl succinimide and the thio analog would have the structures:

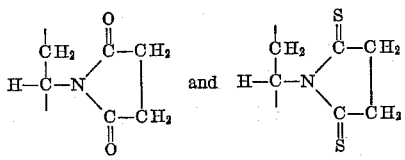

N-substituted maleimides, the thio analogs and the compounds N-nitrosomaleimide and N-thiopropionylmaleimide would respectively have the structures:

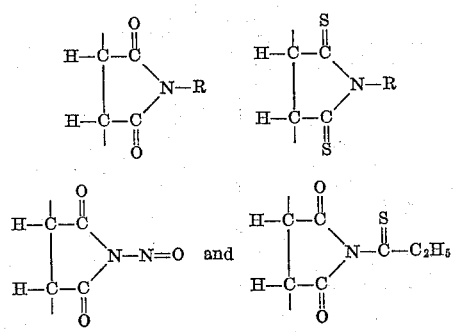

N-acetyl-N-ethyl-p-vinylbenzenesulfonamide would have the structure:

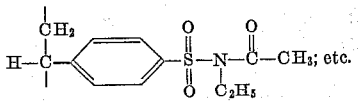

The preferred class of backbone polymers contain the initiator sites —CO.NR.CO—, since this active-site group can be readily incorporated in the backbone polymers by the use of numerous readily available materials.

The instant graft copolymers are then produced by the use of the aforesaid active-site backbone polymer as an initiator for the anionic polymerization of the higher lactams, e.g., ε-caprolactam, in the absence of moisture, whereby the polycaprolactam is grown as a side chain onto the backbone polymer at the active sites.

This side-chain polymerization reaction can be effected over a considerable temperature range of from about 30° C. to about 250° C. or higher, but preferably at from about 80° C. to about 200° C. and more preferably still from about 125° C. to about 160° C. It was found that the maximum length to which a polylactam side chain would grow before crosslinking increases with the grafting temperature employed. However, for each backbone system in a given environment there is a critical temperature above which the graft copolymer composition is found to be crosslinked. For example, with a backbone polymer containing about 1 percent N-methacrylylcaprolactam, uncrosslinked graft copolymer was obtained in mass polymerization reactions with caprolactam at temperatures as high as 155° C. and under the same conditions crosslinked polymer was obtained at 160° C., thus indicating a critical temperature between 155° C. and 160° C. for this system. In similar fashion backbone polymer prepared from a monomer mixture containing 5 percent of N-methacrylylcaprolactam was found to provide uncrosslinked graft copolymer at temperatures up to 100° C. and crosslinked graft copolymer at temperatures above 110° C., indicating a critical temperature between 100° C. and 110° C. for this system. When the said active-site-containing monomer was increased to provide 10 percent of such active sites in the polymer backbone it was observed that crosslinking occurred at about 80° C. However by effecting the graft polymerization in a solvent system, such as toluene, it was found that the critical temperatures of backbone polymers containing 5 percent and 10 percent of the said active sites could be raised to between about 110° and 115° C.

The grafting of the polylactam chain onto the backbone polymer also requires the presence of an anionic polymerization catalyst in an amount which can vary from a small fraction of 1 mole percent, e.g., from about 0.01 mole percent, to as much as 15 to 20 mole percent based on the lactam monomer. In general, however, the preferred anionic catalyst concentrations will vary from about 0.05 to about 5 mole percent and more preferably still from about 0.1 to about 2 mole percent. Suitable anionic polymerization catalysts are any of the metals, in metallic, complex ion, or a compound form, which are capable of forming lactam salts, e.g. sodium caprolactam. Common examples of such catalysts are the alkali and alkaline earth metals, e.g., sodium, potassium, lithium, calcium, strontium, barium, magnesium, etc., either in metallic form or in the form of hydrides, borohydrides, oxides, hydroxides, carbonates, etc. However, in the case of compounds such as the hydroxides and carbonates, which give off water when reacted with lactams, such water must be substantially removed prior to contact with the active-site backbone polymer, for example, by the application of heat and/or reduced pressure. If such water is not removed, the lactam ion is not stable and hydrolytic polymerization of the lactam may take place, whereby the desired graft copolymer may not be obtained. A preferred procedure is to effect the combination of the anionic polymerization catalyst and the lactam in the absence of the initiator backbone polymer. The aforesaid procedure is particularly important in the event that anionic polymerization catalysts, which evolve water, are employed. It will also be apparent that the metallic or metal hydride, e.g., sodium or sodium hydride, in contact with the lactam will evolve hydrogen gas which must be properly vented to preclude any fire hazard therefrom. Other effective anionic polymerization catalysts are the organometallic derivatives of the foregoing metals as well as other metals, illustrative examples of which are the lithium, potassium, and sodium alkyls such as butyl lithium, ethyl potassium, and propyl sodium, or the aryl compounds of such metals such as sodium phenyl, triphenylmethylsodium, and the like; Grignard reagents, i.e., organomagnesium halides such as methylmagnesium bromide, phenylmagnesium bromide, ethylmagnesium bromide, and the like.

The polylactam graft copolymers can be prepared by mass polymerization procedures in a reactor or on mill rolls, or can be prepared in an inert solvent, e.g., benzene, toluene, xylene, tetralin, decalin, etc. Preferably the grafting polymerization is also carried out in the substantial absence of oxygen, i.e., closed reaction vessels or molds are employed which may be swept by an inert gas such as nitrogen. The grafting polymerization reaction may range over periods of from several minutes to several hours depending upon the initiator-site activity, the reaction temperature, the size of the polylactam side chain desired, etc. It will be understood that the number of the grafted polylactam side chains is controlled by regulating the mole ratio of the initiator-site-containing, or producing, monomer in the preparation of the backbone polymer composition. In accordance with the aforesaid disclosure it will be apparent that a large variety of graft copolymers containing polylactam side chains can be tailormade as desired.

Whereas the monomers disclosed for the preparation of the site-containing backbone polymer may be termed ethylenic unsaturated monomers, which are capable of polymerizing with other ethylenic unsaturated monomers, it will be seen that many of such monomers contain the vinyl group, $CH_2=CH-$, but related terminally ethylenic unsaturated monomers, such as $CH_2=CR'''-$, wherein $R''$ is a lower alkyl radical, and other polymerizable compounds containing the ethylenic bond, such as the N-substituted maleimides, maleic anhydride, and the like, can be employed to provide the essential site-containing portion of said backbone polymer, the non-sitecontaining monomers are vinyl compounds, whereby the term "vinyl backbone polymer," "vinyl copolymer," etc., will be understood to mean the polymer products obtained from the addition copolymerization of one or more site-containing monomers, including vinyl monomers, preferably with one or more non-site-containing vinyl monomers.

Also the side-chain graft is broadly referred to as a "polylactam," however it will be understood that when the lactam monomers are polymerized by initiation of and attachment at the active site of the backbone polymer the resulting polymer side chain is essentially a polyamide.

The following examples are illustrative of the instant invention.

*Example 1*

A sample of the monomer N-methacrylylcaprolactam was prepared in a 1-liter flask fitted with a thermometer, stirrer, nitrogen inlet tube, dropping funnel, and a reflux condenser protected by a drying tube, by the introduction thereto of 47.25 g. (0.35 mol) of sodium caprolactam suspended in 150 ml. of anhydrous benzene. A solution of 41.8 g. (0.40 mol) of methacrylyl chloride in 50 ml. of anhydrous benzene was added thereto through the dropping funnel over a period of about 2 hours while stirring the reaction mass and maintaining the temperature below about 25° C. by external cooling. The reaction mixture was then stirred overnight at the aforesaid temperature. Then the benzene solution was washed with a 5 percent solution of sodium carbonate to neutralize the excess acid chloride, followed by three water washings. The organic layer was separated, dried overnight with anhydrous magnesium sulfate, filtered, and the benzene stripped off with a water aspirator protected by a Dry-Ice trap. The final traces of solvent were removed at 2 mm. mercury pressure at 35° C. over a period of about 17 hours. The N-methacrylylcaprolactam was further purified by distillation under reduced pressure (81 to 82° C. at 0.15 to 0.18 mm. mercury pressure) to obtain the clear, water white, mobile liquid product.

*Example 2*

To effect the mass polymerization of styrene with N-methacrylylcaprolactam a mixture of 9.5 g. (0.091 mol) of styrene, 0.5 g. (0.0028 mol) of N-methacrylylcaprolactam, and 0.05 g. (0.5 weight percent) of $\alpha,\alpha'$-azobisisobutyronitrile was formed in a dry, necked-down test tube. Then the tube was sealed under nitrogen, shaken and placed in an oil bath held at 70.2° C. overnight and a hard, brittle, clear, water-white copolymer product was obtained. The product was removed from the reaction vessel, dissolved in 200 ml. of a 50:50 mixture of benzene and methylethylketone and the solution slowly poured into 1 liter of methanol in a Waring Blendor to precipitate the copolymer. The product was recovered and dried overnight in a vacuum oven (about 20 mm. Hg) at 60° C. Yields up to 99 percent of the 95/5 copolymer product were obtained.

In similar fashion other copolymer products of styrene/N-methacrylylcaprolactam of from 90/10 to 99/1 were prepared.

*Example 3*

In similar fashion to Example 2, a tube was charged with 9.5 g. (0.091 mol) of styrene and 0.5 g. (0.006 mol) of methacrylyl chloride and the tube sealed under nitrogen. The tube was then exposed to ultraviolet light (General Electric S–1 sun lamp) for a period of several days to obtain a hard, brittle, clear, yellow-tinged 95/5 styrene/methacrylyl chloride copolymer product.

In similar fashion styrene/methacrylyl chloride copolymer products of 50/50, 60/40, 70/30, 80/20, 90/10, 98/2 and 99/1 were prepared.

*Example 4*

Into a closed reaction vessel fitted with a stirrer, nitrogen inlet tube and a reflux condenser were charged (1) 10 parts of a 90/10 styrene/N-methacrylylcaprolactam copolymer, (2) 126.2 parts caprolactam, (3) 0.26 part sodium hydride and about 120 parts anhydrous benzene, wherein all parts are by weight and the mole ratio of (1):(2):(3) was 0.005 (as the site-containing unit): 1.0:0:01. The reaction mixture was heated at 80° C. under nitrogen and was observed to become a highly gelled, stiff, clear composition after about 1 hour. Heating was terminated and distilled water added to kill the catalyst. The bulk of the benzene was stripped off under vacuum and the reaction mass was then suspended in 2000 parts of water and made just acid with hydrochloric acid. The suspension was then heated at the simmer point (about 100° C.) for 2.5 hours, filtered, washed with hot water and the product dried to constant weight in a vacuum oven at 70 to 75° C. The graft copolymer product was found to consist of about 47.4 weight percent of polycaprolactam grafted onto the polymer backbone, corresponding to an average of about 14.2 mole units of caprolactam per initiator site. The graft copolymer was found to be completely soluble in m-cresol.

*Example 5*

A closed reaction vessel was charged with 10 parts of a 90/10 styrene/N-methacrylylcaprolactam copolymer, which was dissolved in 45.2 parts of caprolactam at 100° to 130° C.; then the temperature was raised to 160° C. and 45.2 parts of caprolactam containing 0.8 part of sodium caprolactam added thereto, wherein all parts are by weight. The mole ratio of the aforesaid materials was 0.007 copolymer (as the site-containing unit):0.007 sodium caprolactam:1.0 caprolactam. The reaction mass became a solid polymeric mass after less than 50 minutes reaction time. The graft copolymer was ground, leached, dried, and was found to consist of about 72.7 weight percent of polycaprolactam grafted onto the polymer backbone, corresponding to an average of about 42.2 mole units of caprolactam per initiator site.

*Example 6*

A mixture of 10 parts of a 95/5 styrene/N-methacrylylcaprolactam copolymer and 90.4 parts caprolactam was heated to 160° C. and the copolymer dissolved in the caprolactam monomer and 0.068 part of sodium hydride mixed therein, providing a mole ratio of 0.0035 copolymer (as the site-containing unit):0.0035 sodium hydride:1.0 caprolactam. The reaction mass was gel-like within 5 minutes after the addition of the anionic polymerization catalyst, was a solid mass within 1 hour, and heating terminated after about 80 minutes' reaction time. The solid polymer product was ground, leached for 2.5 hours, washed and dried in a vacuum oven at 75° C., similar to Example 4. The graft copolymer was found to consist of about 89.4 weight percent of polycaprolactam grafted onto the polymer backbone, corresponding to an average of about 267 mole units of caprolactam per initiator site.

*Example 7*

A mixture of 12.5 parts of a 95/5 styrene/N-methacrylylcaprolactam copolymer and 113 parts caprolactam was heated with stirring under a nitrogen atmosphere at 80° C. for about 2.5 hours to dissolve the copolymer. Then 0.2 part sodium hydride was added in two portions and the temperature held at about 80° C. for a period of about 2.5 hours. The precipitated polymer was suspended in water and treated in a similar manner to the product in Example 4. The graft copolymer was found to consist of about 18.3 weight percent of polycaprolactam grafted onto the polymer backbone, corresponding to an average of about 7.1 mole units of caprolactam per initiator site.

Example 8

A similar mixture to that of Example 7, providing a mole ratio of 0.0035 copolymer (as the site-containing unit):0.007 sodium hydride:1.0 caprolactam was dissolved in about 350 parts anhydrous toluene at 110° C. The reaction was terminated after 100 minutes reaction time by the addition of water and then most of the toluene was stripped off. The reaction mixture was then suspended in water and treated in similar fashion as shown in Example 4. The graft copolymer product was found to consist of about 34.9 weight percent of polycaprolactam grafted onto the polymer backbone, corresponding to an average of about 16.9 mole units of caprolactam per initiator site.

Example 9

A mixture of 15 parts of 99/1 styrene/N-methacrylylcaprolactam copolymer and 113 parts caprolactam was heated under nitrogen at 110° C. to dissolve the copolymer. Then 0.24 part of sodium hydride was mixed therein and the temperature raised to 160° C. over about 20 minutes. Within about one hour after the addition of the sodium hydride the reaction mixture had become cloudy. The reaction mixture was heated for another hour then an additional 0.24 part of sodium hydride introduced therein. The mole ratio of the reaction mass at this time was 0.00083 copolymer (as the site-containing unit):1.0 caprolactam:0.02 sodium hydride. Within an hour of the second catalyst addition the reaction mass was observed to be increasing in viscosity. The reaction was continued overnight and in the morning was observed to be a hard solid. The polymeric mass was broken up and treated in a similar manner to the product in Example 4. The graft copolymer was found to consist of about 77.9 weight percent of polycaprolactam grafted onto the polymer backbone, corresponding to an average of about 563 mole units of caprolactam per initiator site.

In a similar experiment to the above, but with a single addition of sodium hydride catalyst, the reaction mass was solid after a total reaction time of about 6 hours.

Example 10

A mixture of 13.5 parts of a 99/1 styrene/N-methacrylylcaprolactam copolymer, 101.7 parts caprolactam, and 0.216 part sodium hydride (mole ratio 0.00083:1.0:0.01) was dissolved in about 155 parts of anhydrous toluene at 110° C., wherein all parts are in parts by weight. After about 1- and 2-hour reaction times, respectively, two additional increments of 0.216 part sodium hydride were added to increase the mole ratio catalyst component to 0.03. The reaction was continued overnight to obtain a viscous reaction mass. The toluene was stripped therefrom and the polymer product suspended in water made just acid with hydrochloric acid for 3.5 hours at about 100° C. to leach the product. Then the suspension was filtered, washed with hot water several times, and the product dried in a vacuum oven at 70° C. to constant weight. The graft copolymer was found to consist of about 14 weight percent of polycaprolactam grafted onto the polymer backbone, corresponding to an average of about 26 mole units of caprolactam per initiator site.

Example 11

A mixture of 2 parts of a 50:50 copolymer of styrene/methacrylyl chloride and 226 parts of caprolactam was heated to 160° C. and 0.4 part of sodium hydride added thereto, wherein parts are by weight, which final mixture contains the aforesaid materials respectively in the mole ratio of 0.005 (as the active-site-containing unit methacrylyl chloride):1.0:0.01. Within a reaction time of 15 minutes the reaction mass was converted to a solid graft copolymer composition.

Related graft copolymer compositions were readily prepared from other copolymers of styrene and methacrylyl chloride wherein the mole ratios were maintained as above and the graft polymerization temperature of 160° C. was employed:

| Example | Styrene: methacrylyl chloride | Parts copolymer | Reaction mixture solid |
|---|---|---|---|
| 12 | 60:40 | 2.2 | Within 22 minutes. |
| 13 | 80:20 | 5.2 | Within 20 minutes. |
| 14 | 95:5 | 20.8 | Do. |

Example 15

A 0.77 g.-sample of a 50:50 copolymer of isobutylene/maleic anhydride was dissolved in 113 g. caprolactam at 190° C. Then the mixture was cooled to 160° C. and 0.24 g. of sodium hydride mixed therein. The mole ratio is, respectively, 0.005:1.0:0.01. Within 8 minutes of the addition of the anionic polymerization catalyst, the reaction mixture had increased substantially in viscosity and the reaction was carried out for a total time of 1.5 hours. A reddish color was observed on the addition of the sodium hydride, but the color was removed on subsequent leaching of the polymeric product with water. The conversion of the caprolactam to the graft copolymer was found to be 97 percent.

Example 16

A 0.63 g.-sample of a 50:50 copolymer of ethylene/maleic anhydride was dissolved in 113 g. of caprolactam at 160° C., then 0.24 g. of sodium hydride was mixed therein. After a reaction period of 30 minutes the reaction mass was a rubbery consistency, and during the next 15-minute period the reaction mass was sufficiently solidified to slightly pull away from the reactor walls. The reaction was terminated after a total time of about 2.5 hours and the gaft copolymer composition recovered.

Example 17

A copolymer of 20.8 g. styrene with 0.63 g. acrylic anhydride was formed in the presence of 0.1 g. azobenzene catalyst. The copolymer was dissolved in 40 g. caprolactam at 70° C., the operation being carried out under a nitrogen atmosphere. The mixture was then heated to 160° C. and 0.48 g. (0.01 mole) sodium hydride dispersion added thereto and mixed therein. The reaction mixture set up to a solid mass within 6 minutes after the addition of the anionic polymerization catalyst. The reaction mixture was held at 160° C. for a total time of 3 hours, then cooled and the solid product ground and leached to remove any unreacted caprolactam. The graft copolymer product was then recovered and dried.

Whereas the foregoing illustrative examples employ caprolactam, since it is the most important member of the lactams and is readily available as a commercial product, it should be understood that other lactams and mixtures thereof can be employed in the instant invention. Preferably the higher lactams containing at least 6 carbon atoms in the lactam ring are employed. Such lactams would include cyclohexanone isoxime (i.e., ε-caprolactam), methylcyclohexanone isoximes, cycloheptanone isoxime, cyclooctanone isoxime, cyclopentadecanone isoxime, cyclic hexamethylene adipamide, and the like. The lactams containing from 6 to 8 carbon atoms in the lactam ring are particularly preferred, i.e. lactams having the structural formula:

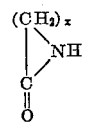

wherein $x$ is an integer from 5 to 7.

To demonstrate that the instant process directly produced a true graft copolymer free from backbone polymer and side-chain polymer components a fractionation procedure was developed for the system styrene/N-methacrylylcaprolactam copolymer backbone, side-chain polycaprolactam, and graft copolymer compositions of the aforesaid backbone and side chain. It was found that polycaprolactam is soluble in formic acid and m-cresol, but insoluble in methylethyl ketone; the copolymer backbone is soluble in methylethylketone and m-cresol, but insoluble in formic acid; and the non-crosslinked graft copolymer is soluble only in m-cresol. By dissolving the reaction product in m-cresol and then precipitating with excess methylethylketone, any copolymer backbone will remain in solution and can be precipitated with excess methanol to recover the insoluble copolymer backbone fraction, if any. The preciptate with the methylethylketone will contain the graft copolymer and the polycaprolactam, if any. This precipitate is then redissolved in m-cresol and then treated with an excess of formic acid. The graft copolymer will be precipitated and the polycaprolactam, if any, will remain in solution and can be precipitated therefrom with water to obtain the polycaprolactam fraction. Various representative reaction products were treated by the aforesaid fractionation scheme, for example, copolymers of styrene/N-methacrylylcaprolactam in ratios of 99:1, 99:1 and 95:5, containing respectively 445, 26, and 10 to 14 caprolactam units per initiation site of the copolymer backbone. It was found from these fractionation studies that all of the polycaprolactam formed was chemically bonded to the copolymer backbone and that all of the copolymer backbone carried graft branches, i.e., the product was a graft copolymer and was entirely free from copolymer backbone or side-chain polymer fractions.

The subject graft copolymers are useful in making cast, molded, or extruded objects and can be modified in similar manner to other plastic compositions by the incorporation therein of stabilizers, plasticizers, fillers, and the like. These graft copolymers are characteriezd by a very broad stifflex range and improved solvent resistance over the polylactam alone or the backbone polymer alone or physical blends thereof. The uncross-linked graft copolymers are soluble only in m-cresol and by effecting the graft polymerization process at higher temperatures, as in cast polymerization processes, to directly form the desired object the graft copolymer is sufficiently cross-linked to be insoluble even in m-cresol.

We claim:

1. A graft copolymer consisting essentially of a linear backbone polymeric product, prepared by the addition polymerization of an ethylenic unsaturated monomer, and containing a polylactam side-chain, containing at least 6 carbon atoms per unit of said polylactam, grafted thereto through an active site located on said linear backbone polymeric product essentially containing an N,N-diacyl tertiary amine grouping characterized by the structural formula

wherein the variable components of said structural formula are selected from the group consisting of: (1) A is an acyl radical selected from the group consisting of R'-carbonyl, R'-thiocarbonyl, R'-sulfonyl, R₂'-phosphonyl, and R₂'-thiophosphonyl radicals, wherein R' is selected from the group consisting of a hydrocarbon radical, free from non-benzenoid unsaturation, and a heterocyclic radical wherein each radical contains up to 10 carbon atoms and derivatives of said hydrocarbon and heterocyclic radicals containing substituents therein selected from the group consisting of carbonyl, N-substituted carbamyl, sulfonyl, tertiary amino, alkoxy, and ether groups; (2) B is an acyl radical selected from the group consisting of A and nitroso radicals; (3) R is selected from the group consisting of A, B, a hydrocarbon radical, free from non-benzenoid unsaturation, containing less than 13 carbon atoms and a heterocyclic radical containing up to 10 carbon atoms and derivatives of said hydrocarbon and heterocyclic radicals containing substituents therein selected from the group consisting of carbonyl, N-substituted carbamyl, sulfonyl, tertiary amino, alkoxy, and ether groups; (4) A and B together forms a ring structure; and (5) A and R together forms a ring structure; and not more than one ring structure is formed by linking A together with one of the group consisting of B and R, and each of A, B and R are selected from the above-defined groups only once for any given structure, and at least one of the group A, B, and R from each active-site-grouping is bonded to the said linear backbone polymer.

2. The graft copolymer of claim 1, wherein the polylactam side-chain contains from 6 to 8 carbon atoms per unit of the polylactam.

3. The graft copolymer of claim 2, wherein the polylactam side-chain contains 6 carbon atoms per unit of the polylactam.

4. The graft copolymer of claim 1, wherein the linear backbone polymeric product consists of the addition copolymerization product of (a) a vinyl hydrocarbon containing less than 12 carbon atoms per unit of the vinyl hydrocarbon moiety within the said backbone polymer and (b) at least an effective amount, to initiate the polymerization of a higher lactam containing at least 6 carbon atoms in the lactam ring, of an active-site-containing ethylenic monomer unit characterized by containing the structural group

5. The graft copolymer of claim 4, wherein at least 1 mole percent of the active-site-containing ethylenic monomer unit moiety is present in the linear backbone polymeric product.

6. The graft copolymer of claim 5, wherein A and B contain carbonyl radicals directly attached to the nitrogen atom of the active-site-structural group and R is a hydrocarbon radical.

7. A process for preparing a graft copolymer consisting essentially of polymerizing a lactam under anhydrous conditions in the presence of (I) a linear polymeric product, prepared by the addition polymerization of an ethylenic unsaturated monomer, essentially containing a plurality of N,N-diacyl tertiary amine groupings as an active site, wherein said active-site-groupings are characterized by the structural formula

wherein the variable components of said structural formula are selected from the group consisting of: (1) A is an acyl radical selected from the group consisting of R'-carbonyl, R'-thiocarbonyl, R'-sulfonyl, R₂'-phosphonyl, and R₂'-thiophosphonyl radicals, wherein R' is selected from the group consisting of a hydrocarbon radical, free from non-benzenoid unsaturation, and a heterocyclic radical wherein each radical contains up to 10 carbon atoms and derivatives of said hydrocarbon and heterocyclic radicals containing substituents therein selected from the group consisting of carbonyl, N-substituted carbamyl, sulfonyl, tertiary amino, alkoxy, and ether groups; (2) B is an acyl radical selected from the group consisting of A and nitroso radicals; (3) R is selected from the group consisting of A, B, a hydrocarbon radical, free from non-benzenoid unsaturation, containing less than 13 carbon atoms and a heterocyclic radical containing up to 10 carbon atoms and derivatives of said hydrocarbon and heterocyclic radicals containing substituents therein selected from the group consisting of carbonyl, N-substituted carbamyl, sulfonyl, tertiary amino, alkoxy, and ether groups; (4) A and B together forms a ring structure; and (5) A and R together forms a ring structure; and not more than one ring structure is formed by linking A together with one of the group consisting of B and R, and each of A, B and R are selected from the above-defined groups only once for any given structure, and at least one of the group A, B, and R from each active-site-grouping is bonded to the said linear polymeric product, and said active site, calculated in terms of the active-site-containing monomeric unit, is present in an amount of at least 0.01 mole percent, based on the lactam monomer; and (II) at least 0.01 mole percent, based on the lactam monomer, of an anionic polymerization catalyst.

8. The process of claim 7, wherein the anionic polymerization catalyst is present in an amount of from about 0.05 to about 5 mole percent, based on the lactam monomer, and the polymerization temperature is from about 80° to about 200° C.

9. The process of claim 8, wherein the linear polymeric product, prepared by the addition polymerization or an ethylenic unsaturated monomer, contains at least 1 mole percent of the active-site-containing monomer unit.

10. The process of claim 9, wherein the active-site-containing monomer units consist of from about 1 to about 50 mole percent of the total ethylenic unsaturated monomer units making up the said linear polymeric product.

11. The process of claim 9, wherein the active-site-containing monomer units consist of from about 1 to about 10 mole percent of the total ethylenic unsaturated monomer units making up the said linear polymeric product.

12. The process of claim 9, wherein the lactam contains at least 6 carbon atoms in the lactam ring.

13. The process of claim 12, wherein the lactam is ε-caprolactam.

14. The process of claim 13, wherein the active-site-containing monomer is N-methacrylylcaprolactam.

15. A process for preparing a graft copolymer consisting essentially of polymerizing a higher lactam, containing at least 6 carbon atoms in the lactam ring, under anhydrous conditions in the presence of (I) a linear copolymeric product prepared by the addition copolymerization of (a) a vinyl hydrocarbon monomer containing up to 20 carbon atoms with (b) at least 1 mole percent of an active-site-containing ethylenic monomer containing the structural group

wherein the variable components of said structural formula are selected from the group consisting of: (1) A is an acyl radical selected from the group consisting of $R'$-carbonyl, $R'$-thiocarbonyl, $R'$-sulfonyl, $R_2'$-phosphonly, and $R_2'$-thiophosphonyl radicals, wherein $R'$ is selected from the group consisting of a hydrocarbon radical, free from non-benzenoid unsaturation, and a heterocyclic radical wherein each radical contains up to 10 carbon atoms and derivatives of said hydrocarbon and heterocyclic radicals containing substituents therein selected from the group consisting of carbonyl, N-substituted carbamyl, sulfonyl, tertiary amino, alkoxy, and ether groups; (2) B is an acyl radical selected from the group consisting of A and nitroso radicals; (3) R is selected from the group consisting of A, B, a hydrocarbon radical, free from non-benzenoid unsaturation, containing less than 13 carbon atoms and a heterocyclic radical containing up to 10 carbon atoms and derivatives of said hydrocarbon and heterocyclic radicals containing substituents therein selected from the group consisting of carbonyl, N-substituted carbamyl, sulfonyl, tertiary amino, alkoxy, and ether groups; (4) A and B together forms a ring structure; and (5) A and R together forms a ring structure; and not more than one ring structure is formed by linking A together with one of the group consisting of B and R, and each of A, B and R are selected from the above-defined groups only once for any given structure, and at least one of the group A, B and R from each active-site-grouping is bonded to the ethylenic moiety of the said ethylenic monomer; said linear copolymeric product providing at least 0.01 mole percent, based on the lactam monomer, of the active-site-containing monomer unit; and (II) at least 0.01 mole percent, based on the lactam monomer, of an anionic polymerization catalyst; and the graft copolymerization reaction is carried out in an inert atmosphere within the temperature range of from about 80° to about 200° C.

16. The process of claim 15, wherein the graft copolymerization reaction is carried out in an anhydrous inert hydrocarbon solvent.

References Cited in the file of this patent
UNITED STATES PATENTS

| | | |
|---|---|---|
| 2,277,152 | Schlack | Mar. 24, 1942 |
| 2,647,105 | Mighton | July 28, 1953 |
| 2,657,972 | Woodward | Nov. 3, 1953 |